United States Patent

Kuijper

[15] 3,701,114

[45] Oct. 24, 1972

[54] CAPACITIVE SYMMETRIZATION OF A STORAGE

[72] Inventor: Josephus Theodorus Maria Kuijper, Beekbergen, Netherlands

[73] Assignee: U.S. Philip Corporation, New York, N.Y.

[22] Filed: April 3, 1970

[21] Appl. No.: 25,351

[30] Foreign Application Priority Data

April 4, 1969 Netherlands..............6905736

[52] U.S. Cl...........................340/173 SP, 340/173 R

[51] Int. Cl..............................................G11c 17/00

[58] Field of Search........340/173 SP, 174; 174/68.5; 333/84, 7; 317/101 CM; 339/17 N, 17 M, 17 LC

[56] References Cited

UNITED STATES PATENTS

| | | | |
|---|---|---|---|
| 3,470,499 | 9/1969 | Lentz | 333/7 |
| 3,467,950 | 9/1969 | Sivyer | 340/173 SP |

*Primary Examiner*—Maynard R. Wilbur
*Assistant Examiner*—William W. Cochran
*Attorney*—Frank R. Trifari

[57] ABSTRACT

The invention relates to a "read-only" storage formed by a pile of plates having printed circuits. The parasitic capacitances between the wirings of these plates differ with the lower and upper plates from those with the other plates. By providing an additional capacitance between the input terminals of the circuits of the lower and upper plates this assymmetry is obviated.

1 Claim, 1 Drawing Figure

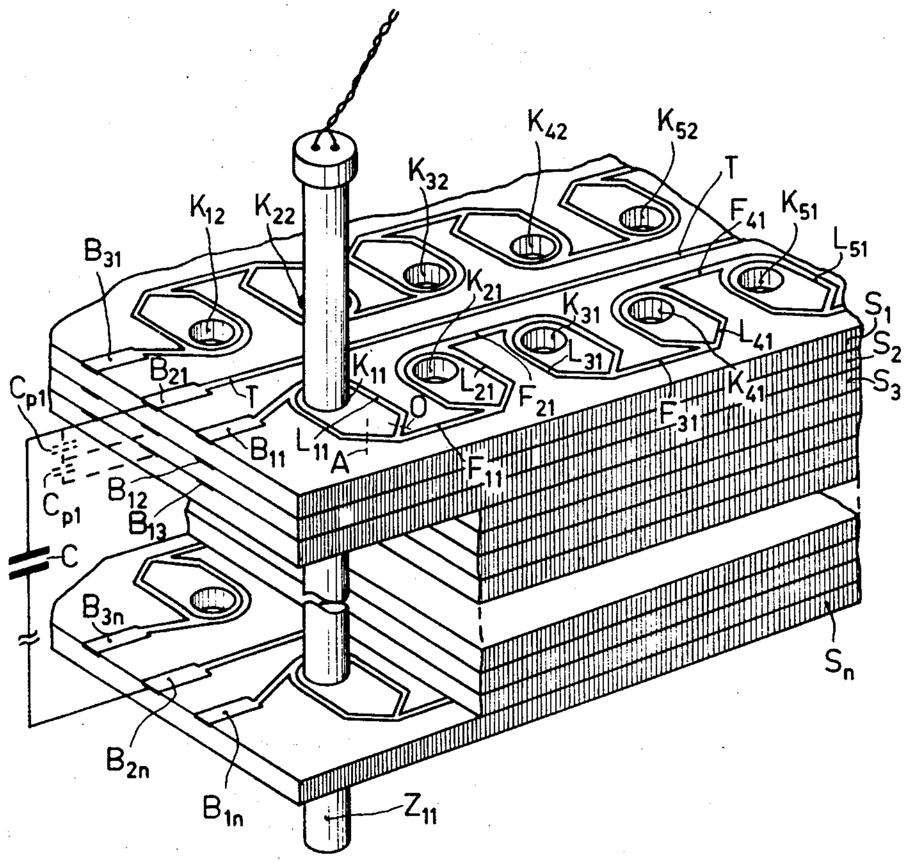
INVENTOR.
JOSEPHUS TH.M. KUIJPER
BY
AGENT

CAPACITIVE SYMMETRIZATION OF A STORAGE

The invention relates to a memory store comprising at least three plates of insulating material, piled up to form a packet and provided on at least one side with printed wiring and having each at least one input connecting terminal.

Such stores formed by plates with printed wiring may be employed as "read only" stores, in which the fixed word information is obtained by punching holes in the plates on the printed wiring.

These plates with printed wiring, when joined to a packet, exhibit parasitic capacitances between the wirings of the various plates, the value of the capacitance of the wiring on a plate between the superjacent and subjacent plates being largely the highest. The values of the capacitances relative to the wirings of the other plates are lower in inverse proportion to the distance from said plates. These parasitic capacitances of the wirings are not equal for all plates and they are the lowest with the upper and lower plates of a packet, because they have only one neighboring plate. Therefore, the input impedances of the wirings of the plates will be different in accordance with the location of the plates in the packet, the difference being the greater, the nearer is the plate to the bottom or top side of the packet. A major disadvantage involved is that the pulse heights of the information to be read for the plates nearer the top side and the bottom side of the packet differ from those of the plates nearer the center of the packet. The voltage differcne between the maximum pulse heights representing a logical "0" and the minimum pulse heights representing a logical "1" is therefore considerably smaller with pulses originating from different plates than that of pulses originating from the same plate. By stacking up the plates the possibility of erroneous reading of information is strongly increased, since the read amplifier(s) has (have) one fixed threshold value. In order to equalize on a first approximation the input impedances of the printed wirings of all plates, RC-networks can be connected to the input terminals of the printed wirings of the lowermost and uppermost plates. However, since pulses are used for the data processing, this has the disadvantage of being costly and time-consuming, if a correct input impedance has to be obtained throughout the frequency range. The invention obviates these disadvantages and this provides in a simple manner for the whole frequency range a complete capacitive symmetrization of the wirings of all plates. The storage device according to the invention is characterized in that capacitors are provided between the corresponding input terminals of the upper and lower plates. It is thus ensured that the pulse heights of pulses from the lower and upper plates of the packet are no longer substantially different from those of pulses from plates located at the center of the packet, so that for the storage device one loop amplifier or loop amplifiers having equal, fixed threshold values can be employed.

The invention will be described more fully with reference to one embodiment shown in the drawing.

The FIGURE shows only a portion of the "read only" store formed by $n$ plates stacked up ($S_1, S_2, \ldots S_n$), made of insulating material and provided with a regular pattern of holes in a column and row array ($K_{11}, K_{12}, \ldots K_{1R}; K_{21}, K_{22}, \ldots K_{2R}; K_{31}, \ldots K_{MR}$). The holes of consecutive plates ($S_1, \ldots S_n$) register with one another after the plates are stacked, so that channels are formed ($K_{e,o}$). In these channels read coils are arranged; only the coil ($Z_{11}$) arranged in the channel $K_{11}$ is shown. The plates are provided with printed tracks in the pattern shown. These tracks have widened connecting strips ($B_{11}, B_{21}, \ldots B_{R1}; B_{12}, B_{22}, \ldots; \ldots B_{RN}$). The printed track being in contact with the input connecting strip $B_{11}$ embraces by the loops ($L_{11}, L_{21}, \ldots L_{M1}$) interconnected via the straight printed tracks ($F_{11} \ldots F_{M-1,1}$), the holes ($K_{11} \ldots K_{M1}$). After the hole $K_{M1}$ the printed track is connected to the straight printed track T, which serves as a return conductor and is connected to the point $B_{21}$. Also the printed track connected to the input point $B_{31}$, beyond its loop around the hole $K_M$, 2, is connected to the track T. This pattern is repeated at the connecting points ($B_{41}, B_{51}, B_{61}; B_{71}$, etc. up to $B_{R1}$). In order to ensure that a given read coil ($S_{D,G}$) is embraced or not embraced by a printed track connected between $B_{3V-2,h}$ and $B_{3V-1,h}$ or between $B_{3V,h}$ and $B_{3V-1,h}$ ($V = 1, 2, \ldots (1/3)R$ and $h = 1, \ldots n$), as is shown for the read coil $S_{11}$ (where $V = 1$ and $h = 1$), the loop $L_{11}$ is interrupted at O or A of the printed track by a punched hole. By stacking up the plates $S_1, \ldots S_n$, the printed tracks are at a distance equal to the thickness of one plate from each other. Thus the tracks of consecutive plates are coupled capacitively. The capacitance of the printed track of the plate $S_2$ relative to the printed tracks of the plates $S_1$ and $S_3$, measured at the input terminal, is the same and has a value $C_{p1}$. This is indicated in the Figure by broken lines. The capacitances of the printed tracks measured at the input terminals of the upper and lower plates have, however, a single parasitic capacitance of the value $C_{p1}$, because they have only one neighboring plate. This also applies to the parasitic capacitances not shown $C_{p2}$ between the printed tracks on the plates $S_1, S_3$ and $S_3, S_5$, etc. The impedance measured at the input terminals of the lower and upper plates therefore exhibits the highest difference from that of the further plates. In order to equalize the input impedances of all plates throughout the frequency range, the input terminals $B_{3V-1,1}$ and $B_{3V-1,n}$ (for $V = 1, 2, 3, \ldots (1/3)R$) have arranged between them capacitors C as is shown in the Figure between $B_{21}$ and $B_{2,n}$.

As an alternative groups of plates (for example, $S_1$ to $S_4$, $S_5$ to $S_8$, etc) may be combined by interconnecting corresponding input terminals inside such a group (for example $B_{3V-1,1}$ to $B_{3V-1,4}$; $B_{3V-1,5}$ to $B_{3V-1,8}$, etc.) in order to obtain more information from the store per group of input terminals. In this case a capacitor C is arranged only between the connecting terminals of the lower and upper groups of plates in order to obtain symmetrization of the input impedances of the printed wirings of the groups of plates.

What is claimed is:

1. A storage device comprising at least three plates of insulating material in stacked relationship, substantially identical printed wiring on a side of each plate in the stack, at least one input terminal connected to the printed wiring on each plate in the stack, and a capacitor connected between input terminals of the outer plates in the stack.

* * * * *

PO-1050
(5/69)

UNITED STATES PATENT OFFICE
CERTIFICATE OF CORRECTION

Patent No. 3,701,114 Dated October 24, 1972

Inventor(s) JOSEPHUS THEODORUS MARIA KUIJPER

It is certified that error appears in the above-identified patent and that said Letters Patent are hereby corrected as shown below:

IN THE TITLE PAGE

"[30] Foreign Application Priority Data

April 4, 1969 Netherlands..............6905736"

should read:

--[30] Foreign Application Priority Data

April 14, 1969 Netherlands............6905736--.

Signed and sealed this 6th day of March 1973.

(SEAL)
Attest:

EDWARD M.FLETCHER,JR.
Attesting Officer

ROBERT GOTTSCHALK
Commissioner of Patents